US007440604B2

(12) United States Patent
Tsuji et al.

(10) Patent No.: US 7,440,604 B2
(45) Date of Patent: Oct. 21, 2008

(54) IMAGE DETECTOR FOR BANK NOTES

(75) Inventors: Keiji Tsuji, Inba-gun (JP); Toshio Kasai, Gyouda (JP); Wataru Iida, Matsudo (JP); Tomoyoshi Zenki, Kameoka (JP)

(73) Assignee: Laurel Precision Machines Co., Ltd., Osaka (JP)

( * ) Notice: Subject to any disclaimer, the term of this patent is extended or adjusted under 35 U.S.C. 154(b) by 711 days.

(21) Appl. No.: 10/854,578

(22) Filed: May 25, 2004

(65) Prior Publication Data

US 2004/0240721 A1 Dec. 2, 2004

(30) Foreign Application Priority Data

May 28, 2003 (JP) ............................ 2003-151265

(51) Int. Cl.
*G06K 9/00* (2006.01)

(52) U.S. Cl. ...................................... 382/137; 382/140

(58) Field of Classification Search ................. 382/135, 382/137, 140; 356/71; 250/200; 902/7
See application file for complete search history.

(56) References Cited

U.S. PATENT DOCUMENTS 4,723,072 A 2/1988 Naruse
4,737,649 A 4/1988 Naruse
5,280,333 A 1/1994 Wunderer et al.
5,576,825 A 11/1996 Nakajima et al.
5,966,456 A 10/1999 Jones et al.
6,061,121 A 5/2000 Holl et al.
6,104,036 A * 8/2000 Mazowiesky ............... 250/556
6,573,983 B1 * 6/2003 Laskowski ................... 356/71
6,734,953 B2 5/2004 Numata (Continued)

FOREIGN PATENT DOCUMENTS

DE 3500650 A1 7/1985

(Continued)

OTHER PUBLICATIONS

Notice of Office Action for the U.S. Appl. No. 10/854,579 by USPTO on Jun. 15, 2007.

(Continued)

*Primary Examiner*—Bhavesh Mehta
*Assistant Examiner*—John B Strege
(74) *Attorney, Agent, or Firm*—Knobbe Martens Olson & Bear LLP

(57) ABSTRACT

An image detector for bank notes is provided which can be made at low cost and in small size. The image detector comprises a pair of detector units 13 includes a first image detection sensor 24 which detects an image of a first detection area mounted on one side of a detector unit 18, a first light emitting device 27 which irradiates light towards the first detection area, and a second light emitting device 31 which irradiates light towards a second detection area mounted on one side of the unit main body 18 but in a different location from the first detection area, a pair of detector units is disposed so as to oppose one another across a bank note transportation path 12, in a manner which enables the image detection sensor 24 of one of the detection units 13 to detect an image of the second detection area of the other of the detection units 13.

17 Claims, 2 Drawing Sheets

U.S. PATENT DOCUMENTS

| | | | |
|---|---|---|---|
| 6,926,201 | B2 | 8/2005 | Numata |
| 7,007,788 | B2 | 3/2006 | Dunlop et al. |
| 7,110,573 | B2 | 9/2006 | Monk et al. |
| 2003/0031342 | A1 | 2/2003 | Sperl et al. |
| 2003/0043365 | A1 | 3/2003 | Ross et al. |
| 2003/0123049 | A1 | 7/2003 | Gerz et al. |
| 2004/0218802 | A1 * | 11/2004 | Suzuki ....................... 382/137 |

FOREIGN PATENT DOCUMENTS

| | | |
|---|---|---|
| GB | 2379501 A | 3/2003 |
| JP | 60-146386 | 8/1985 |
| JP | 60-146388 | 8/1985 |
| JP | 60-164237 | 8/1985 |
| JP | 60-164886 | 8/1985 |
| JP | 05-199363 | 8/1993 |
| JP | 11-086073 | 3/1999 |
| JP | 2001-357429 | 12/2001 |
| TW | 425531 | 3/2001 |
| WO | WO 01/61654 A | 8/2001 |

OTHER PUBLICATIONS

European Search Report by European Patent Office.

* cited by examiner

IMAGE DETECTOR FOR BANK NOTES

RELATED APPLICATIONS

This application is related to, and hereby incorporates by reference, U.S. Patent Application entitlted IMAGE DETECTOR FOR BANK NOTES", filed on even date herewith and having application Ser. No. 10/854,579.

BACKGROUND OF THE INVENTION

1. Field of the Invention

The present invention relates to an image detector for bank notes which is used when discriminating between bank notes.

2. Description of Related Art

Technology relating to image detectors for bank notes used for example when discriminating the authenticity, denomination and state of wear of bank notes, includes technology in which a light emitting unit mounted to one side of a bank note transportation path irradiates light onto a bank note, and the light transmitted through the bank note is detected by a light receiving unit mounted on the other side of the bank note transportation path, and technology in which light is irradiated onto a bank note from a light emitting section mounted on one side of a transportation path of a light emitting and receiving unit, and the reflected light is detected by a light receiving section of the same light emitting and receiving unit (see Patent document 1, for example). Furthermore, technology relating to image sensor modules used in such image detectors for bank notes has also been disclosed (see Patent document 2, for example).

Patent document 1: Japanese Unexamined Patent Application, First Publication No. Hei 2001-357429

Patent document 2: Japanese Patent No. 3099077

In order to improve the accuracy of discrimination when discriminating the authenticity, denomination and state of wear and the like of bank notes, one method is to discriminate based on the image of one side of the bank note, from either the front or back direction, the image of the reverse side of the bank note, and a front and back transmission image of the bank note, and discriminate based on these images collectively. However, when performing the discrimination in this manner, if the image detector for bank notes disclosed in patent document 1 is used, there is a problem in that a light emitting and receiving unit is required for detecting the image of one side of the bank note, from either the front or back direction, a light emitting and receiving unit is required for detecting the image of the reverse side of the bank note, and a light emitting unit and a light receiving unit are required for detecting the front and back transmission image of the bank note, which increases the cost of the device, as well as the overall size of the device, and also makes maintenance more complicated due to the different types of units.

SUMMARY OF THE INVENTION

Accordingly, one aspect of the invention provides an image detector for bank notes which enables the cost to be lowered, the overall size of the device to be reduced, and which is also easy to maintain.

In one embodiment, a pair of detector units comprising an image detection sensor which detects an image of a first detection area mounted on one side of a unit main body, a first light emitting device which irradiates light towards the first detection area, and a second light emitting device which irradiates light towards a second detection area mounted on said one side of the unit main body but in a different location from the first detection area, all disposed within the unit main body, are disposed so as to oppose one another across a bank note transportation path, in a manner which enables the image detection sensor of one of the detection units to detect an image of the second detection area of the other of the detection units.

As a result, the image detection sensor of one of the pair of detection units that are disposed so as to oppose one another across the bank note transportation path, detects an image, namely a front and back transmission image, of the second detection area which is irradiated with light by the second light emitting device of the other detection unit. Furthermore, the image detection sensor of the detection unit on one side of the bank note transportation path detects an image, namely a reflected image of either the front or the back side, of the first area irradiated with light by the first light emitting device of this first detection unit, and the image detection sensor of the detection unit on the opposite side detects an image, namely a reflected image of the other side in the front and back direction, of the first area irradiated with light by the first light emitting device of this first detection unit. Consequently, by using the pair of detection units, it is possible to detect an image of one side in the front and back direction of the bank note, an image of the reverse side in the front and back direction of the bank note, and a front and back transmission image of the bank note. Moreover, it is possible to detect both a front and back transmission image and a reflected image of one side in the front and back direction of the bank note using the image detection sensor of one of the detection units.

A second aspect of the invention is an image detector for bank notes according to the first aspect, wherein the pair of detection units are disposed so that the image detection sensors are positioned on opposite sides of the bank note transportation path in the bank note transportation direction.

Accordingly, the pair of detection units are mounted such that the image detection sensor of one of the detection units can detect an image of the second detection area of the other detection unit, and the image detection sensors of the detection units are on opposite sides of the bank note transportation path in the bank note transportation direction. As a result, it is possible for the pair of detection units to overlap completely in the bank note transportation direction.

A third aspect of the invention is an image detector for bank notes according to the second aspect, wherein symmetrical guide sections which guide the introduction of the bank notes to be transported via the bank note transportation path, are formed at each end of the bank note transportation path in the bank note transportation direction, on one side of the unit main body.

In this manner, the symmetrical guide sections which guide the introduction of the bank notes transported via the bank note transportation path are formed at both ends in the transportation direction, on the side of the unit main body that becomes the bank note transportation path side. Consequently, even when the pair of detection units are mounted such that the image detection sensor of one of the detection units can detect an image of the second detection area of the other detection unit, and the image detection sensors of the detection units are on opposite sides of the bank note transportation path in the bank note transportation direction, so that the pair of detection units can overlap in the bank note transportation direction, the guide sections which guide the introduction of bank notes are disposed on the upstream side of both of the pair of detection units.

A fourth aspect of the invention is an image detector for bank notes according to the second or third aspect, wherein a distance from one end in the bank note transportation direction of the bank note transportation path of the unit main body to the first detection area, and a distance from the other end in the bank note transportation direction of the bank note transportation path of the unit main body to the second detection area, are equal.

In this manner, because the distance from one end of the unit main body to the first detection area is equal to the distance from the other end of the unit main body to the second detection area, when a pair of detection units is mounted so that the image detection sensor of one of the detection units can detect an image of the second detection area of the other detection unit, and the image detection sensors of the detection units are positioned on opposite sides in the bank note transportation direction of the bank note transportation path, the pair of detection units can be made to overlap completely in the bank note transportation direction.

A fifth aspect of the invention is an image detector for bank notes according to any of the first through fourth aspects, wherein the first light emitting device and the second light emitting device are each configured to be able to irradiate light in a plurality of different wavelength ranges.

In this manner, because both the first light emitting device and the second light emitting device are constructed to enable the irradiation of light in a plurality of different wavelength ranges, it is possible to detect reflected images or front and back transmission images for when the light is irradiated in different wavelength ranges.

A sixth aspect of the invention is an image detector for bank notes according to the fifth, wherein the first light emitting device and the second light emitting device each comprise a light guide body that is approximately the same length as, or longer than, the image detection sensor and is disposed in parallel to the image detection sensor, and light emitting elements that are provided at both ends in the length direction of the light guide body and irradiate light of a plurality of different wavelength ranges into the light guide body.

Consequently, light of a plurality of different wavelength ranges is irradiated into the light guide body by the light emitting elements provided at both lengthwise ends of the light guide body, and this light is then irradiated from the light guide body towards the bank note. Therefore, when using the image detection sensor to detect a wide range of the bank note in the length direction orthogonal to the transportation direction, light can be irradiated over a wide range in the length direction of the bank note from the light guide bodies, which are approximately the same length as the image detection sensors.

A seventh aspect of the invention is an image detector for bank notes according to the sixth aspect, wherein the light emitting elements each have a plurality of light emitting element sections, each of which is capable of irradiating light independently in a desired wavelength range.

Because in this manner, the light emitting elements each have a plurality of light emitting element sections, each of which is capable of irradiating light independently in a desired wavelength range, it is possible to irradiate light in a plurality of different wavelength ranges by driving each of the light emitting element sections independently.

An eighth aspect of the invention is an image detector for bank notes according to any of the first through seventh aspects, wherein a lens body is provided inside the unit main body between the first detection area and the image detection sensor.

In this manner, a lens body is disposed inside the unit main body between the first detection area and the image detection sensor, and the lens body is also integrated into the detection unit.

DETAILED DESCRIPTION OF THE INVENTION

An image detector for bank notes according to an embodiment of the present invention is described below with reference to FIG. 1 and FIG. 2.

Figure 1:
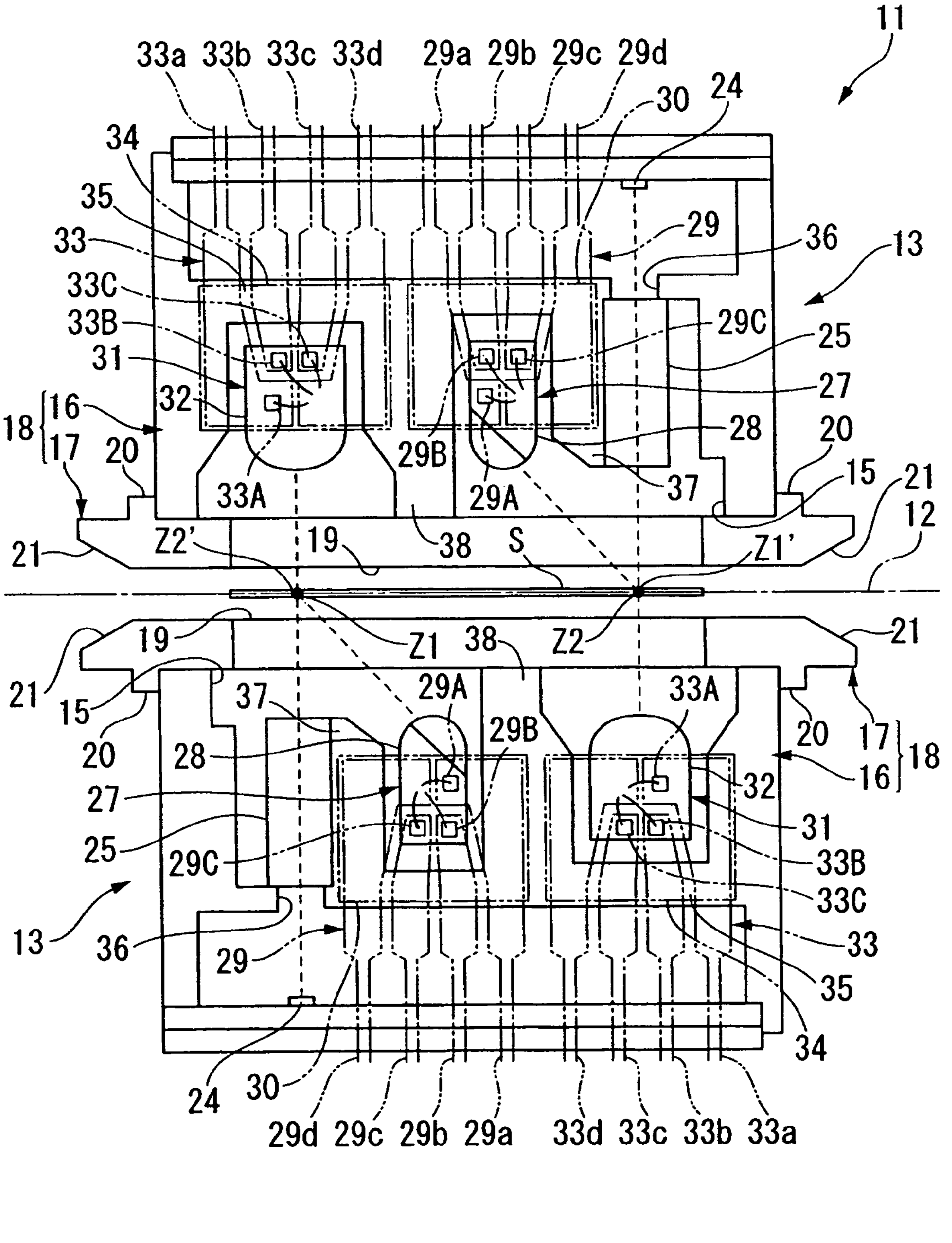
FIG. 1 is an enlarged side cross-sectional view showing an image detector for bank notes according to an embodiment of the present invention, viewed from one side in the length direction.

As shown in FIG. 1, an image detector for bank notes 11 of the present embodiment comprises a pair of identically constructed detection units 13, mounted so as to oppose each other across a bank note transportation path 12 which transports a bank note S in a straight line.

The dimensions of the detection unit 13 are substantially larger in the length direction (the direction orthogonal to the paper surface in FIG. 1) than in the thickness direction (the vertical direction in FIG. 1) and the width direction (the crosswise direction in FIG. 1), giving the detection unit 13 an elongated shape. The detection unit 13 has a unit main body 18, comprising a housing body 16 in the shape of an elongated box with an opening 15 provided on one side in the thickness direction of the detection unit 13, and a flat elongated translucent cover 17 mounted to the housing body 16 so as to close the opening 15. Because this unit main body 18 forms the outer part of the detection unit 13, its dimensions in the length direction, the thickness direction and the width direction match those of the detection unit 13.

The translucent cover 17 is formed from a transparent material such as glass, and protrusions 20 are formed on the side which is fitted to the housing body 16, at both ends of the translucent cover 17 in the width direction, whereas both ends in the width direction of the surface 19, which represents the opposite side of the translucent cover 17 to the housing body 16, are symmetrical with a mirrored surface, and are formed into beveled sections 21 which narrow towards both ends in the width direction. Positioning of the translucent cover 17 and the housing body 16 is achieved by fitting the housing body 16 inside the portion of the translucent cover 17 enclosed by the protrusions 20.

A CCD sensor (image detection sensor) 24 is provided inside the container main body 18 to one side thereof in the width direction, and on the side opposite to the translucent cover 17. As with the unit main body 18, this CCD sensor 24 is also an elongated shape, and is fitted to the housing body 16 of the unit main body 18 such that the length direction of the CCD sensor 24 matches the length direction of the unit main body 18. The image detection direction of this CCD sensor 24 faces towards the translucent cover 17 along the thickness direction of the unit main body 18. The length of the CCD sensor 24 is longer than that of the longest bank note S that the device is expected to handle.

An elongated fiber lens array (lens body) 25 is provided inside the unit main body 18, towards the front in the detection direction of the CCD sensor 24, that is on the translucent cover 17 side, and in parallel with the CCD sensor 24. This fiber lens array 25 is mounted to the housing body 16 of the unit main body 18 so that the position of the fiber lens array in the width direction and the length direction of the unit main body 18 overlaps the CCD sensor 24 completely. The length of the fiber lens array 25 is also longer than that of the longest bank note S that the device is expected to handle.

Here, the CCD sensor 24 positions the first detection area, which is the detection area for the image captured via the fiber lens array 25, at a point that is located a predetermined distance outside the translucent cover 17 in the detection direction (in FIG. 1, Z1 indicates the first detection area for the lower detection unit 13 and Z1' indicates the first detection area for the upper detection unit 13), and as such, the line that connects this first detection area and the CCD sensor 24 is orthogonal to the surface 19. Obviously, the shape of the first detection area is also elongated in the length direction of the unit main body 18. Consequently, the CCD sensor 24 detects an image of the first detection area located outside the translucent cover 17 on one side of the unit main body 18. Furthermore, the fiber lens array 25 is disposed inside the unit main body 18 between the first detection area and the CCD sensor 24.

An elongated first light emitting body (first light emitting device) 27 that irradiates light diagonally towards the first detection area is provided inside the unit main body 18, and is positioned inward of the fiber lens array 25 in the width direction, and in parallel with the CCD sensor 24 and the fiber lens array 25 (the direction of the light is indicated by the dashed line in FIG. 1). This first light emitting body 27 is mounted to the housing body 16 of the unit main body 18 such that the position of the light emitting body overlaps completely with the CCD sensor 24 and the fiber lens array 25 in the length direction of the unit main body 18.

Figure 2:
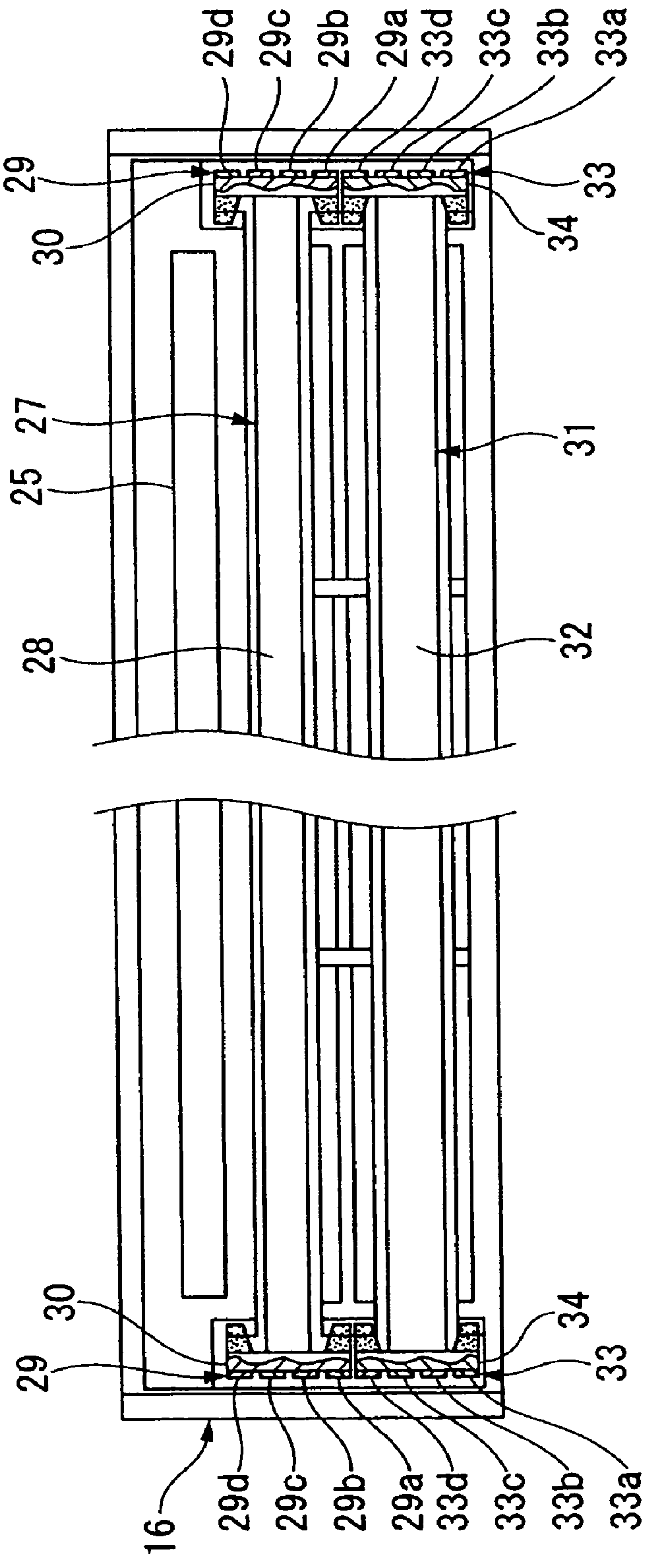
FIG. 2 is a front view showing a detection unit of the image detector for bank notes according to the embodiment of the present invention, with a translucent cover omitted.

This first light emitting body 27 comprises an elongated light guide body 28, made of a transparent material such as glass, which is approximately the same length as, or longer than, the CCD sensor 24 and is mounted in parallel with the CCD sensor 24, and as shown in FIG. 2, also comprises light emitting elements 29 composed of semiconductor elements that are provided on the outer surfaces of a pair of rectangular mounting plates 30, which are formed at both ends of the light guide body 28 in the length direction and extend in a direction orthogonal to this length direction, and these light emitting elements 29 irradiate light into the light guide body 28 from both ends. The length of the first light emitting body 27 is also longer than that of the longest bank note S that the device is expected to handle.

Inside the unit main body 18, on the opposite side of the first light emitting body 27 from the fiber lens array 25 in the width direction of the unit main body 18, an elongated second light emitting body (second light emitting device) 31 is provided in parallel with the first light emitting body 27, the CCD sensor 24 and the fiber lens array 25, and this second light emitting body 31 irradiates light directly towards the second detection area, which is set at a different location from the first detection area mentioned above, but is parallel to this first detection area and is the same distance from the translucent cover 17 as the first detection area (in FIG. 1, Z2 indicates the second detection area for the lower detection unit 13, and Z2' indicates the second detection are for the upper detection unit 13). This second light emitting body 31 is fitted to the housing body 16 of the unit main body 18 such that the position of the light emitting body overlaps completely with the first light emitting body 27, the CCD sensor 24 and the fiber lens array 25 in the length direction of the unit main body 18. Furthermore, the second light emitting body 31 positions the second detection area at a point that is located a predetermined distance outside the translucent cover 17 along the thickness direction of the unit main body 18, and irradiates light in this direction.

This second light emitting body 31 comprises an elongated light guide body 32, made of a transparent material such as glass, which is approximately the same length as, or longer than, the CCD sensor 24 and is mounted in parallel with the CCD sensor 24, and as shown in FIG. 2, also comprises light emitting elements 33 composed of semiconductor elements that are provided on the outer surfaces of a pair of rectangular mounting plates 34, which are formed at both ends of the light guide body 32 in the length direction and extend in a direction orthogonal to this length direction, and these light emitting elements 33 irradiate light into the light guide body 32 from both ends. The length of the second light emitting body 31 is also longer than that of the longest bank note S that the device is expected to handle.

Here, the distance from one end of the unit main body 18, namely the first detection area side in the width direction, to the first detection area is equal to the distance from the other end of the unit main body 18, namely the second detection area side in the width direction, to the second detection area.

The first light emitting body 27 and the second light emitting body 31 are described below in more detail.

In the first light emitting body 27, the light emitting elements 29 provided on each end face in the length direction are disposed so as to be able to irradiate light into the light guide body 28 in a plurality of wavelength ranges, specifically three different wavelength ranges, and a plurality of LED elements, specifically three LED elements (light emitting diodes) 29A, 29B and 29C, each being capable of irradiating light independently in a desired wavelength range, are connected to terminal sections 29*a*, 29*b*, 29*c* and to a common electrode terminal 29*d* by wire bonding or the like. With this construction, by choosing one of the terminal sections 29*a* through 29*c* and applying a voltage between that terminal section and the common electrode terminal 29*d*, it is possible to switch between the LED elements 29A through 29C to emit light. By choosing the light emission wavelength of the LED elements 29A through 29C, it is possible to irradiate light in three chosen wavelength ranges, of either visible light such as RGB, ultraviolet light or infrared light. For example, it is possible to irradiate a combination of infrared light, green light and ultraviolet light using the three LED elements 29A through 29C. Furthermore, if light is weak in a particular wavelength range, then it is also possible to emit that light from a plurality of the LED elements 29A through 29C in order to secure satisfactory light emitting performance (for example, if green light is weak then one LED element can emit infrared light and two can emit green light).

Here, in the description of the light emitting elements 29 provided at either end of the light guide body 28, a construction is described in which the LED elements 29A through 29C which coincide in terms of their position on the surface orthogonal to the length direction of the light guide body 28 irradiate light in the same wavelength range. However, it is not essential that these opposing LED elements 29A through 29C irradiate light in the same wavelength range.

Furthermore, it is not essential that the wavelength ranges of the light irradiated by the three LED elements 29A through 29C at one end face and the wavelength ranges of the light irradiated by the three LED elements 29A through 29C at the other end face be a combination of light in three wavelength ranges, and it is possible to emit light from a maximum of six wavelength ranges.

In the second light emitting body 31, as in the first light emitting body 27, the light emitting elements 33 provided on each end face are disposed so as to be capable of irradiating light into the light guide body 32 in a plurality of wavelength ranges, specifically three different wavelength ranges, and a plurality of LED elements, specifically three LED elements (light emitting diodes) 33A, 33B and 33C, each being capable of irradiating light independently in a desired wavelength range, are connected to terminal sections 33*a*, 33*b*, 33*c* and to a common electrode terminal 33*d* by wire bonding or the like. With this construction, by choosing one of the terminal sections 33*a* through 33*c* and applying a voltage between that terminal section and the common electrode terminal 33*d*, it is possible to switch between the LED elements 33A through 33C to emit light. By choosing the light emission wavelength of the LED elements 33A through 33C, it is possible to irradiate light in three chosen wavelength ranges, of either visible light such as RGB, ultraviolet light or infrared light. For example, it is possible to irradiate a combination of infrared light, green light and ultraviolet light using the three LED elements 33A through 33C as. Furthermore, if light is weak in a particular wavelength range, then it is also possible to emit that light from a plurality of the LED elements 33A through 33C in order to secure satisfactory light emitting performance (for example, if green light is weak then one LED element can emit infrared light and two can emit green light).

In one embodiment, when using the first light emitting body 27 and the second light emitting body 31 to emit light in a plurality of different wavelength ranges, and then detecting a reflected image off either the front or the back side, or a front and back transmission image in a plurality of different wavelength ranges using the CCD sensor 24 of one detection unit 13, the first light emitting body 27 or the second light emitting body 31 emits light in the plurality of different wavelength ranges with different timing, and that this timing is synchronized so that the CCD sensor 24 of the detection unit 13 can capture a single line image in each different wavelength range.

A bottom wall 35 is formed in the housing body 16 to prevent light inside the housing body 16 from the first light emitting body 27 and the second light emitting body 31 from leaking into the CCD sensor 24, an opening 36 is formed in this bottom wall 35 only in a position in front of the CCD sensor 24 in the detection direction, and the fiber lens array 25 is fitted so as to cover this opening 36. Furthermore, a side wall 37 which prevents light from the first light emitting body 27 and the second light emitting body 31 from leaking into the fiber lens array 25, and a side wall 38 which prevents leakage of light between the first light emitting body 27 and the second light emitting body 31 are also formed in the housing body 16.

On the other hand, the bank note transportation path 12 mentioned above transports the bank note S directly in a straight line, with the length direction of the bank note S orthogonal to the transportation direction, and the width direction of the note parallel to the transportation direction. Therefore in FIG. 1, the length direction of the bank note S is mounted in the direction orthogonal to the paper surface, the width direction of the bank note S is aligned with the crosswise direction of the paper surface, and the bank note S is transported in the crosswise direction across the paper surface, from left to right for example.

Furthermore, the image detector for bank notes 11 comprises the pair of detection units 13, and as described above each of these detection units comprises the CCD sensor 24 which detects an image of the first detection area mounted on one side of the unit main body 18, the first light emitting body 27 which irradiates light towards the first detection area, and the second light emitting body 31 which irradiates light towards the second detection area mounted on the same side of the unit main body 18 but in a different location from the first detection area, all disposed within the unit main body 18, and this pair of detection units 13 is mounted so as to oppose one another across the bank note transportation path 12 such that the CCD sensor 24 of one of the detection units 13 can detect an image of the second detection area of the other detection unit 13. At this time, the pair of detection units 13 oppose one other in an disposition wherein the surface sections 19 of the respective translucent covers 17 are parallel to the bank note transportation path 12.

In other words, one of the detection units 13 is disposed on one side of the bank note transportation path 12 with the translucent cover 17 thereof facing the bank note transportation path 12, and the other detection unit 13 is disposed on the opposite side of the bank note transportation path 12, and is orientated in a state equivalent to a 180° inversion of the first detection unit 13 about an axis along the length direction, with the detection direction of the CCD sensor 24 of the first detection unit 13 aligned with the irradiation direction of light from the second light emitting body 31 of the other detection unit 13. In other words, the pair of detection units 13 are disposed so that the CCD sensor 24 of the detection unit 13 in the lower part of FIG. 1 can detect an image of the second detection area Z2' of the detection unit 13 in the upper part of FIG. 1 (that is, the second detection area Z2' overlaps the first detection area Z1), and the CCD sensor 24 of the detection unit 13 in the upper part of FIG. 1 can detect an image of the second detection area Z2 of the detection unit 13 in the lower part of FIG. 1 (that is, the second detection area Z2 overlaps the first detection area Z1').

At this time, the pair of detection units 13 are aligned in the length direction, and in the width direction the detection units 13 are aligned with the bank note transportation direction of the bank note transportation path 12. The position of the pair of detection units 13 relative to the bank note transportation path 12 is set so that the detection units 13 can detect an image of the entire length of each bank note S transported along the bank note transportation path 12 with the width of the note aligned with the transportation direction. In other words, the position of the pair of detection units 13 relative to the bank note transportation path 12 is set so that the entire length direction of the bank note S transported along the bank note transportation path 12 lies within the lengthwise region occupied by the CCD sensor 24, the fiber lens array 25, the first light emitting body 27 and the second light emitting body 31.

Because as mentioned above, the distance from one end of the unit main body 18, namely the first detection area side in the width direction, to the first detection area is set equal to the distance from the other end of the unit main body 18, namely the second detection area side in the width direction, to the second detection area, the pair of detection units 13 are aligned in the width direction.

As a result of the above, the pair of detection units 13 are disposed such that the CCD sensors 24 thereof are positioned on opposite sides of the bank note transportation path 12 in the bank note transportation direction, and the beveled sections 21, which act as symmetrical guides for guiding the introduction of the bank notes S to be transported along the bank note transportation path 12, are formed at both ends of the translucent cover 17 of each unit main body 18 in the transportation direction, on the bank note transportation path 12 side of each translucent cover 17.

According to such an image detector for bank notes 11, the CCD sensor 24 of one of the pair of detection units 13 which oppose each other across the bank note transportation path 12 detects an image, namely a front and back transmission image, of the second detection area onto which light is irradiated by the second light emitting body 31 of the other detection unit 13, by scanning the second detection area in the length direction, and such front and back transmission images are detected at a plurality of timings during transportation of the bank note S.

Furthermore, according to the image detector for bank notes 11, the CCD sensor 24 of one of the pair of detection unit 13 detects an image, namely a reflected image of either the front or the back side, of the first detection area which is irradiated with light by the first light emitting body 27 of this detection unit 13, by scanning in the length direction, and such reflected images of one side in the front and back direction are detected at a plurality of timings during transportation of the bank note S (these timings are different from those used when detecting the transmission images).

In addition, according to the image detector for bank notes 11, the CCD sensor 24 of the opposing detection unit 13 detects an image, that is a reflected image of the opposite side in the front and back direction, of the first detection area which is irradiated with light by the first light emitting body 27 of this detection unit 13, by scanning in the length direction, and such reflected images of the opposite side in the front and back direction are detected at a plurality of timings during transportation of the bank note S (these timings are different from those used when detecting the transmission images and the reflected images of the first side).

The image detector for bank notes 11 then compares the front and back transmission image data, the reflected image data of one side in the front and back direction and the reflected image data of the opposite side in the front and back direction, with master data, in an identification device (not shown in the diagrams) for example, to distinguish authenticity, denomination and the state of wear and the like.

The pair of detection units 13 are mounted so as to oppose each other across the bank note transportation path 12, with the CCD sensor 24 of the other detection unit 13 also capable of detecting an image of the second detection area of the one detection unit 13. As a result, it is also possible for the CCD sensor 24 of the other detection unit 13 to detect a front and back transmission image of the bank note S. However, but because a front and back transmission image consists of overlapping images of the front and back sides of the note, only one CCD sensor 24 need detect the image. Accordingly, detection of a transmission image is not performed by the CCD sensor 24 of the other detection unit 13. As a result, the second light emitting body 31 of the one detection unit 13 is not used.

On the other hand, as described above, when attempting to detect a plurality of transmission images in different wavelength ranges using the CCD sensor 24 of one of the detection units 13, a method may be used in which the second light emitting body 31 of the other detection unit 13 emits light at different timings, and in different wavelength ranges, so that the CCD sensor 24 of the other detection unit 13 does not detect any transmission images at all. However, an alternative method may also be used in which the CCD sensor 24 of one of the detection units 13 detects transparency images in some wavelength ranges, and the CCD sensor 24 of the other detection unit 13 detects transparency images in other wavelength ranges.

As described above, according to the image detector for bank notes 11 of the present embodiment, by using a pair of identically constructed detection units 13, it is possible to detect an image of one side in the front and back direction of the bank note S, an image of the reverse side in the front and back direction of the bank note S, and the transmission image for the front and back of the bank note S. Furthermore, it is possible to detect both a front and back transmission image and a reflected image of one side in the front and back direction of the bank note using the CCD sensor 24 of one of the detection units 13. Accordingly, because only two units are required, the cost can be lowered, and the overall size of the device can be reduced. In addition, because there is only one type of detection unit 13, the device is easy to maintain.

Furthermore, by arranging the pair of identically constructed detection units 13 such that the CCD sensor 24 of one of the detection units 13 can detect an image of the second detection area of the other detection unit 13, and the CCD sensors 24 of the detection units 13 are on opposite sides of the bank note transportation path 12 in the bank note transportation direction, it is possible for the pair of detection units 13 to overlap completely in the bank note transportation direction. Accordingly, the overall size of the device can be reduced even further.

In addition, symmetrical beveled sections 21 which guide the introduction of the bank notes S transported via the bank note transportation path 12 are formed at both ends in the transportation direction, on the side of the unit main body 18 that becomes the bank note transportation path 12 side. Consequently even when the pair of detection units 13 are mounted such that the CCD sensor 24 of one of the detection units 13 can detect an image of the second detection area of the other detection unit 13, and the CCD sensors 24 of the detection units 13 are on opposite sides of the bank note transportation path 12 in the bank note transportation direction, so that the pair of detection units 13 can overlap in the bank note transportation direction, the beveled sections 21 which guide the introduction of the bank notes S are disposed on the upstream side of both of the pair of detection units 13. Accordingly, the bank notes S can be guided easily.

In addition, because the distance from one end of the unit main body 18 to the first detection area is equal to the distance from the other end of the unit main body 18 to the second detection area, when the pair of detection units 13 are mounted so that the CCD sensor 24 of one of the detection units 13 can detect an image of the second detection area of the other detection unit 13, and the CCD sensors 24 of the detection units 13 are positioned on opposite sides in the bank note transportation direction of the bank note transportation path 12, the pair of detection units 13 can be made to overlap completely in the bank note transportation direction. Accordingly, the overall size of the device can be reduced even further.

In addition, because both the first light emitting body 27 and the second light emitting body 31 are constructed to enable the irradiation of light in a plurality of different wavelength ranges, it is possible to detect reflected images or front and back transmission images for when the light is irradiated in different wavelength ranges. Accordingly, the discrimination accuracy can be improved.

In addition, the first light emitting body 27 and the second light emitting body 31 irradiate light in a plurality of wavelength ranges into the light guide bodies 28 and 32, by the light emitting electrodes 29 and 33 provided at both lengthwise ends of the light guide bodies 28, 32, and this light is then irradiated from these light guide bodies 28 and 32 towards the bank note S. Therefore, when using the CCD sensor 24 to detect a wide range of the bank note S in the length direction orthogonal to the transportation direction, light can be irradiated over a wide range of the length direction of the bank note S from these light guide bodies 28 and 32, which are approximately the same length as the CCD sensor 24. Accordingly, light in a plurality of wavelength ranges can be irradiated over a wide range of the bank note S.

In addition, because the light emitting elements 29 and 33 each have a plurality of LED elements, specifically three LED elements 29A through 29C and 33A through 33C respectively, each of which is capable of irradiating light independently in a desired wavelength range, it is possible to irradiate light in a plurality of different wavelength ranges by driving the LED elements 29A through 29C and 33A through 33C independently. Accordingly, the circuit structure can be simplified.

In addition, the fiber lens array 25 is disposed inside the unit main body 18 between the first detection area 1 and the CCD sensor 24, and the fiber lens array 25 is also integrated into the detection unit 13. Accordingly, handling of the device can be simplified even further.

In the above, when light is emitted in the respective wavelength ranges, if there is disparity in the sensitivity on the CCD sensor 24 side, it is possible to minimize this disparity in sensitivity by controlling the irradiation time or the drive current used for irradiation, for each of the respective wavelength ranges.

As a described in detail above, according to the first aspect of the present invention, the image detection sensor of one of the pair of detection units that are disposed so as to oppose one another across the bank note transportation path, detects an image, namely a front and back transmission image, of the second detection area which is irradiated with light by the second light emitting device of the other detection unit. Furthermore, the image detection sensor of the detection unit on one side of the bank note transportation path detects an image, namely a reflected image of either the front or the back side, of the first area irradiated with light by the first light emitting device of this first detection unit, and the image detection sensor of the detection unit on the opposite side detects an image, namely a reflected image of the other side in the front and back direction, of the first area irradiated with light by the first light emitting device of this first detection unit. Consequently, by using the pair of detection units, it is possible to detect an image of one side in the front and back direction of the bank note, an image of the reverse side in the front and back direction of the bank note, and a front and back transmission image of the bank note. Moreover, it is possible to detect both a front and back transmission image and a reflected image of one side in the front and back direction of the bank note using the image detection sensor of one of the detection units. Accordingly, the cost can be lowered, and the overall size of the device can be reduced. In addition, because there is only one type of detection unit, the device is easy to maintain.

According to the second aspect of the present invention, the pair of detection units are mounted such that the image detection sensor of one of the detection units can detect an image of the second detection area of the other detection unit, and the image detection sensors of the detection units are on opposite sides of the bank note transportation path in the bank note transportation direction. As a result, it is possible for the pair of detection units to overlap completely in the bank note transportation direction. Accordingly, the overall size of the device can be further reduced.

According to the third aspect of the present invention, the symmetrical guide sections which guide the introduction of the bank notes transported via the bank note transportation path are formed at both ends in the transportation direction, on the side of the unit main body that becomes the bank note transportation path side. Consequently, even when the pair of detection units are mounted such that the image detection sensor of one of the detection units can detect an image of the second detection area of the other detection unit, and the image detection sensors of the detection units are on opposite sides of the bank note transportation path in the bank note transportation direction, so that the pair of detection units can overlap in the bank note transportation direction, the guide sections which guide the introduction of bank notes are disposed on the upstream side of both of the pair of detection units. Consequently the bank notes can be guided in a satisfactory manner.

According to the fourth aspect of the present invention, because the distance from one end of the unit main body to the first detection area is equal to the distance from the other end of the unit main body to the second detection area, when a pair of detection units is mounted so that the image detection sensor of one of the detection units can detect an image of the second detection area of the other detection unit, and the image detection sensors of the detection units are positioned on opposite sides in the bank note transportation direction of the bank note transportation path, the pair of detection units can be made to overlap completely in the bank note transportation direction. Accordingly, the overall size of the device can be further reduced.

According to the fifth aspect of the present invention, because both the first light emitting device and the second light emitting device are constructed to enable the irradiation of light in a plurality of different wavelength ranges, it is possible to detect reflected images or front and back transmission images for when the light is irradiated in different wavelength ranges. Accordingly, the discrimination accuracy can be further improved.

According to the sixth aspect of the present invention, light of a plurality of different wavelength ranges is irradiated into the light guide body by the light emitting elements provided at both lengthwise ends of the light guide body, and this light is then irradiated from the light guide body towards the bank note. Therefore, when using the image detection sensor to detect a wide range of the bank note in the length direction orthogonal to the transportation direction, light can be irradiated over a wide range in the length direction of the bank note from the light guide bodies, which are approximately the same length as the image detection sensors. Consequently, light of a plurality of different wavelength ranges can be irradiated over a wide range of the bank note.

According to the seventh aspect of the present invention, because the light emitting elements each have a plurality of light emitting element sections, each of which is capable of irradiating light independently in a desired wavelength range, it is possible to irradiate light in a plurality of different wavelength ranges by driving each of the light emitting element sections independently. Consequently, the circuit structure can be simplified.

According to the eighth aspect of the present invention, a lens body is disposed inside the unit main body between the first detection area and the image detection sensor, and the lens body is also integrated into the detection unit. Consequently, handling is further simplified.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description but is only limited by the scope of the appended claims.

What is claimed is:

1. An image detector for bank notes comprising a pair of detector units, the detector comprising:

- a first image detection sensor configured to detect an image of a first detection area set on one side of a first detector unit;
- a first light emitting device configured to irradiate light towards said first detection area;
- a second image detection sensor configured to detect an image of a second detection area on one side of a second detector unit;
- a second light emitting device configured to irradiate light towards a said second detection area set on one side of said second detector unit, the second detection area being located in a different location from said first detection area; and
- said first image detection sensor and said first light emitting device being disposed in the first detector unit and said second detection sensor and said second light emitting device being disposed in the second detector unit;
- wherein: a pair of said first and second detector units are disposed so as to oppose one another across a bank note transportation path, in a manner which enables said first image detection sensor in said first detection unit to detect an image of said second detection area and said second image detection sensor in said second detection unit to detect an image of said first detection area; and
- a distance, from one end in the bank note transportation direction of said bank note transportation path of said image detector to said first detection area, and a distance, from the other end in the bank note transportation direction of the bank note transportation path of the image detector to the second detection area, are equal.

2. An image detector for bank notes according to claim 1, wherein said pair of first and second detection units are disposed so that said image detection sensors thereof are positioned on opposite sides of said bank note transportation path in the bank note transportation direction.

3. An image detector for bank notes according to claim 1, wherein symmetrical guide sections which guide the introduction of the bank notes to be transported via said bank note transportation path, are formed at each end of said bank note transportation path in the bank note transportation direction, on each side of said image detector.

4. An image detector for bank notes according to claim 1, wherein said first light emitting device and said second light emitting device are each configured to be able to irradiate light in a plurality of different wavelength regions.

5. An image detector for bank notes according to claim 4, wherein said first light emitting device and said second light emitting device each comprise a light guide body that is approximately the same length as, or longer than, said image detection sensor and is disposed in parallel to said image detection sensor, and light emitting elements that are provided at both ends in the length direction of said light guide body and irradiate light of a plurality of different wavelength ranges into said light guide body.

6. An image detector for bank notes according to claim 5, wherein said light emitting elements each have a plurality of light emitting element sections, each of which is capable of irradiating light independently in a desired wavelength range.

7. An image detector for bank notes according to claim 1, wherein a lens body is provided inside said unit main body between said first detection area and said image detection sensor.

8. A method of image detection for bank notes comprising a pair of detector units, the method comprising:

- detecting, at a first image detection sensor, an image of a first detection area set on one side of a first detector unit;
- irradiating, at a first light emitting device, light towards the first detection area;
- detecting, at a second image detection sensor, an image of a second detection area on one side of a second detector unit; and
- irradiating, at a second light emitting device, light towards the second detection area set on one side of the second detector unit, the second detection area being located in a different location from the first detection area,
- wherein: the first image detection sensor and the first light emitting device are disposed in the first detector unit and the second detection sensor and the second light emitting device are disposed in the second detector unit;
- a pair of the first and second detector units are disposed so as to oppose one another across a bank note transportation path, in a manner which enables the first image detection sensor in the first detection unit to detect an image of the second detection area and the second image detection sensor in the second detection unit to detect an image of the first detection area; and
- a distance, from one end in the bank note transportation direction of said bank note transportation path of said image detector to said first detection area, and a distance, from the other end in the bank note transportation direction of the bank note transportation path of the image detector to the second detection area, are equal.

9. The method according to claim 8, wherein the pair of first and second detection units are disposed so that the image detection sensors thereof are positioned on opposite sides of the bank note transportation path in the bank note transportation direction.

10. The method according to claim 8, wherein symmetrical guide sections which guide the introduction of the bank notes to be transported via the bank note transportation path, are formed at each end of the bank note transportation path in the bank note transportation direction, on each side of the image detector.

11. The method according to claim 8, wherein the first light emitting device and the second light emitting device are each configured to irradiate light in a plurality of different wavelength regions.

12. The method according to claim 11, wherein the first light emitting device and the second light emitting device each comprise a light guide body that is approximately the same length as, or longer than, the image detection sensor and is disposed in parallel to the image detection sensor, and light emitting elements that are provided at both ends in the length direction of the light guide body and irradiate light of a plurality of different wavelength ranges into the light guide body.

13. The method according to claim 12, wherein the light emitting elements each have a plurality of light emitting element sections, each of which is capable of irradiating light independently in a desired wavelength range.

14. The method according to claim 8, wherein a lens body is provided inside the unit main body between the first detection area and the image detection sensor.

15. An image detection device for bank notes comprising a pair of detector units, the device comprising:

- first detecting means for detecting an image of a first detection area set on one side of a first detector unit;
- first irradiating means for irradiating light towards the first detection area;
- second detecting means for detecting an image of a second image detection area on one side of a second detector unit; and second irradiating means for irradiating light towards the second detection area set on one side of the second detector unit, the second detection area being located in a different location from the first detection area, wherein: the first detecting means and the first irradiating means are disposed in the first detector unit and the second detecting means and the second irradiating means are disposed in the second detector unit;

a pair of the first and second detector units are disposed so as to oppose one another across a bank note transportation path, in a manner which enables the first detecting means in the first detection unit to detect an image of the second detection area and the second detecting means in the second detection unit to detect an image of the first detection area; and a distance, from one end in the bank note transportation direction of said bank note transportation path of said image detector to said first detection area, and a distance, from the other end in the bank note transportation direction of the bank note transportation path of the image detector to the second detection area, are equal.

16. The device according to claim 15, wherein the pair of first and second detection units are disposed so that the first and second detecting means thereof are positioned on opposite sides of the bank note transportation path in the bank note transportation direction.

17. The device according to claim 15, wherein symmetrical guide means for guiding the introduction of the bank notes to be transported via the bank note transportation path, are formed at each end of the bank note transportation path in the bank note transportation direction, on each side of the image detector.

* * * * *